Feb. 11, 1969         D. O. SMITH         3,427,092
THIN FILM HIGH FREQUENCY LIGHT MODULATOR USING
TRANSVERSE MAGNETO-OPTICAL EFFECT
Filed June 22, 1964

*INVENTOR:*
DONALD O. SMITH

BY,

*Edward D. Thomas*
AGENT

United States Patent Office 3,427,092
Patented Feb. 11, 1969

3,427,092
THIN FILM HIGH FREQUENCY LIGHT MODULATOR USING TRANSVERSE MAGNETO-OPTICAL EFFECT
Donald O. Smith, Lexington, Mass., assignor to Massachusetts Institute of Technology, Cambridge, Mass., a corporation of Massachusetts
Filed June 22, 1964, Ser. No. 376,986
U.S. Cl. 350—151                    5 Claims
Int. Cl. G02f 1/22, 1/28, 1/26

ABSTRACT OF THE DISCLOSURE

A magneto-optical light modulator used the dichroic absorption property of a thin magnetic film having a direction of magnetization transverse to the direction of propagation of a beam of polarized light, an arrangement in which the absorption of light by the magnetic film depends on the direction of polarization of the light beam. The absorption effect is enhanced by positioning the magnetic film in a composite multilayer quarter-wave dielectric film optical network supported on a mirror substrate at an electric node of the optical standing wave and where the multilayer structure affords an efficient coupling of the thin magnetic film to free space. Crossed polarizer and analyzer elements are oriented in the path of the light beam to provide increased signal to noise ratio.

---

The various magneto-optical Kerr effects have often been explored and various attempts have been made in the past to enhance the effect since the principle of magneto-optical sensing has had the capacity to solve problems involved in the application of external variable magnetic fields. Unfortunately, the sensitivity of the magneto-optical method has been found to be so poor as to allow only very limited application.

In my patent application, Ser. No. 348,453, filed Mar. 2, 1964, now U.S. Patent No. 3,393,957, I described methods for enhancing the longitudinal and polar magneto-optical effects, also with the objective of obtaining high frequency control of light. The transverse effect differs from the longitudinal and polar magneto-optical effects in that there is no direct transfer of energy (mode conversion) within the magnetic material between states of different polarization. Instead, the transverse effect is an example of a general type of optical property known as dichroism, which is characterized by the absorption of a material depending on the direction of polarization of light passing through the material. The utility of magneto-optical dichroism arises by virtue of the fact that the axis of dichroism depends on the orientation of the magnetization which can in turn be controlled by the application of external magnetic fields.

In common with the enhancement of the longitudinal and polar mode conversion magneto-optical effects, the problem of increasing the efficiency of the transverse effect can be divided into two parts, namely: first, increase the degree of interaction between a light wave impinging on the magnetic material and the mode modulation properties of the material, second, in the case of metallic or semiconducting magnetic materials eliminating or reducing by many orders of magnitude ohmic or conductivity loss in the material. It is, therefore, a primary purpose of the present invention to improve the basic efficiency of the magneto-optical dichroic effect. In common with my prior application, referred to above, this problem can be solved by correctly positioning the magnetic material in an optical standing wave and by efficient coupling the magnetic medium to free space.

The use of the transverse effect instead of the polar or longitudinal magneto-optical effect is attractive because in certain situations higher modulation efficiency and lower control fields are obtained. However, sensing presents a problem. Where there is mode conversion, i.e., direct transfer of energy between states of different polarization, a crossed polarizer and analyzer is used effectively to sense the mode conversion and to increase the contrast or signal-to-noise ratio. At first glance, this technique does not appear available for the transverse effect since direct mode conversion does not occur. Another object of the present invention is to show how the crossed polarizer and analyzer can be oriented in order to obtain contrast or signal-to-noise ratio comparable to those obtained with longitudinal and polar effects.

These and other features and advantages of the invention will be apparent from the following detailed description taken together with the accompanying drawing in which.

Figure 1A:
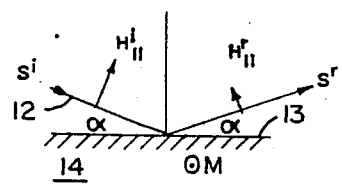
FIGURE 1 illustrates the transverse magneto-optical dichroic effect.

In FIGURE 1, a beam of light 12 is shown incident upon the surface 13 of magnetic material 14. The magnetization M of material 14 is shown oriented into the plane of the drawing perpendicular to the propagation vector S of light beam 12.

FIGURE 1A shows that light beam 12 is polarized into a mode having its optical magnetic field H parallel to the plane of incidence, which after reflection is reduced in intensity because of the dichroic magneto-optical interaction.

Figure 1B:
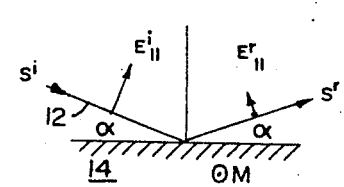

FIGURE 1B shows the case in which light beam 12 is polarized into a mode having its optical electric field E parallel to the plane of incidence and illustrates the analogous modulation.

The extent of energy modulation obtained by an experiment performed according to FIGURE 1 is extremely small, being of the order of $10^{-8}$ or less. This low efficiency is considered to be due in part to impedance mismatch and ohmic loss. This problem can be solved by correctly positioning the magnetic material in an optical standing wave and providing dielectric films to achieve impedance match.

General reference may be made to "Optical Properties of Thin Solid Films," by O. S. Heavens, Butterworth Scientific Publications, London 1955, while the particulars of calculating the magnetic impedance can be found in my report, "Magneto-Optical Properties of Multilayer Films," M. I. T. Lincoln Laboratory Group Report No. 24L–002, Sept. 3, 1963. Briefly, ohmic loss can be reduced to an arbitrarily small value by placing a thin magnetic film at an electric node of an optical standing wave, while impedance match can be achieved with dielectric films.

Figure 2:
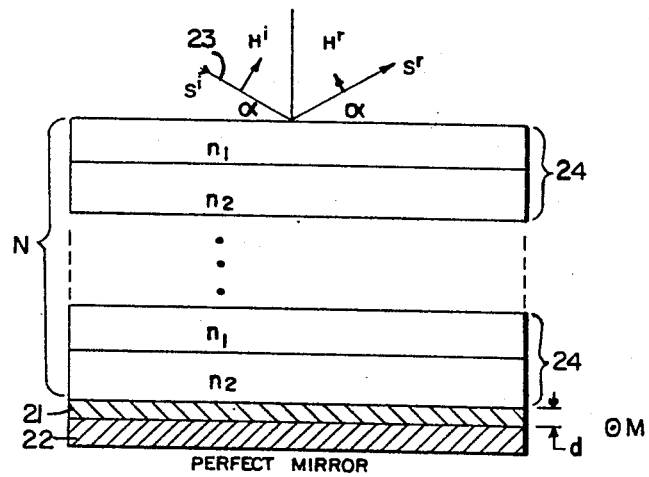
FIGURE 2 represents schematically one embodiment using a thin magnetic film and a multilayer dielectric film structure to enhance the transverse magneto-optical effect.

FIGURE 2 shows a magnetic film 21, having a thickness $d$ of the general order of 200 A., much less than the optical penetration depth, placed at an electric node of an optical standing wave represented as the surface of a perfect mirror 22. As before, the magnetization M of film 21 is shown oriented into the plane of the drawing perpendicular to the propagation vector S of light beam 23 of wavelength $\lambda$. The incident light beam 23 should be polarized in the mode having H parallel to the plane of incidence, since only this mode possesses an electric field node. If the standing wave is considered as two traveling waves with propagation vectors $S^i$ and $S^r$, where $i$ and $r$ refer to incident and reflected waves, respectively, then the total electric field is obtained by algebraic addition of two nearly equal-magnitude but opposite-sign traveling wave fields. Thus, the fields responsible for ohmic loss tend to cancel each other.

As pointed out in detail in my patent application, referred to above, the practical realization of a sufficiently perfect mirror and the impedance matching from free space to the properties of the film remain to be considered. In principle, Maxwell's equations are set up and appropriate boundary conditions are applied. In practice, the resulting equations are complicated and the computations are tedious. One of the well-known techniques for optical impedance matching involves multiple layer dielectric film structures composed of alternate quarter-wave layers of high and low index-of-refraction materials. The dielectric film structure 24 is an example of such an impedance matching network in which a sequence of layers is shown as a succession of double layers. Each double layer 24 consists of a film having an index of refraction $n_1$ and a film having an index of refraction $n_2$ in which each film of the double layer satisfies the quarter-wave condition; the double layers being repeated to the number N as required to secure impedance match. If impedance step up is desired, the sequence starting at the film 21 and progressing to the free air boundary will be high-low (H-L), $n_2$, $n_1$, $n_2$, $n_1$, etc., where $n_1 < n_2$. Cryolite, with an index of refraction of 1.3 and titanium dioxide, index of refraction of 2.8, are often used for such multilayer dielectric film structures.

In FIGURE 2, the magnetc film 21 is shown located at an electric field node represented as the surface of a perfect mirror. Since even silver only has a reflectivity of about 94%, some technique is needed for reducing mirror losses, either absorption in the case of metals or transmission to infinity in the case of glass substrates. This is conveniently done for either type of substrate by adding a periodic dielectric multilayer. Consider, in FIGURE 3 for example, a mirror consisting of R double layers of quarter-wave homogeneous dielectric films having indices of refraction $n_1$ and $n_2$ ($n_1 > n_2$) respectively, on a glass substrate 32, then the entire mirror structure can be described by introducing a mirror A-matrix into the characteristic transfer matrices used to solve the general problem of the reflection and transmission of light by multilayer magnetic and dielectric films. The wave impedance of the mirror is then given by $$m_s = \frac{m_o}{n_g}\left(\frac{n_1}{n_2}\right)2R$$

where $m_s$ represents the wave impedance of the entire mirror combination of glass substrate and iterated dielectric layers, $m_o$ represents the impedance of free space, $n_g$, $n_1$, $n_2$ represent the indices of refraction of glass and dielectric materials and R is the number of iterated double layers. Assuming equal loss in the mirror and the magnetic film leads to an estimate for $m_s$ as $m_s = m_o \times 10^{-3}$, which can be realized with R=5; the corresponding reflectivity of the composite mirror is 99.8%.

For a more complete treatment of the theory of the reflectivity and transmission of dielectric films and to the properties of iterated double layers of homogeneous dielectric films differing in reflection coefficients, reference may be made to "Principles of Optics" by Born and Wolf, Pergamon Press 1959, particularly to Chapter 1, Section 1.6 "Wave Propagation in a Stratified Medium-Theory of Dielectric Films."

The value of using the enhanced transverse dichroic effect is derived from the fact that ohmic loss can be eliminated for incident light impinging at angles other than nearly perpendicular to the plane of the film, or grazing incidence, while at the same time magneto-optical interaction occurs with M in the plane of the film. When the magnetization lies in the plane of the film, only small external fields are required to change the direction of M to control the light modulation.

Figure 3:
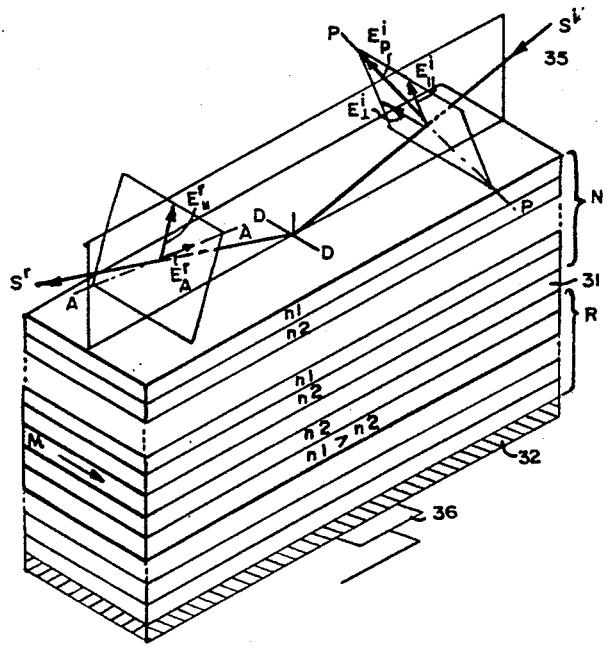
FIGURE 3 is a diagram illustrating the use of a crossed polarizer and analyzer oriented to improve the signal-to-noise ratio of the system.

FIGURE 3 also illustrates the use of crossed polarizer and analyzer elements to provide increased contrast or signal-to-noise ratio. Here a film 31 of magnetized material is shown with the magnetization M lying in the plane of the film. The dichroic axis D—D will lie along M, as shown. Film 31 is supported at an electric node of an optical standing wave represented by the surface of a "perfect" mirror composed of glass substrate 32 and R double-layers represented by dielectric films $n_1$ and $n_2$.

Light beam 35 with a propagation vector $S^i$ is incident at an angle to the film normal and perpendicular to the dichroic axis D—D. A polarizer with axis P—P is oriented at an angle of 45° to the plane of incidence so that the incident electric vector $E_p{}^i$ is also at an angle of 45° to the plane of incidence. The components of $E^i$ perpendicular and parallel to the plane of incidence are designated as $E_I{}^i$ and $E_{II}{}^i$. For the purposes of explanation, it is now assumed that the wave with E perpendicular to the dichroic axis D—D is completely absorbed by magneto-optical interaction. Then the only reflected wave is one with E parallel to the plane of incidence, designated $E_{II}{}^r$. This reflected wave has a component $E_A{}^r$ along the analyzer axis A—A which is then transmitted to a suitable detector such as a phototube (not shown).

If M were rotated by 90°, as by the application of external magnetic fields, as by curent carrying conductor 36, then the dichroic axis would be shifted into the plane of incidence and there would be negligible magneto-optical interaction. Then the reflected light would have its electric field at an angle of 90° to the analyzer axis A—A, and only a very small fraction (of the order of 1 part in $10^7$) would be transmitted to the detector. In this way very high contrast or signal to noise ratio is obtained from the dichroic effect.

The dielectric structure N serves two functions: (1) It must match the magnetic absorption of the $E_I$ mode to the incident medium, e.g. free space; (2) it must mismatch the magnetic absorption and ohmic impedances of the $E_{II}$ mode. The manufacturing techniques employed in the commercial production of multiple layer films for optical purposes is readily available to build such structures once the specifications such as wavelength of the incident radiation, angle of incidence, required enhancement and the like have been decided.

From the foregoing description, enhancement of the dichroic magneto-optical effect is achieved by:

First, enhancing the reflectivity of a substrate by the use of a multilayer dielectric film structure to obtain a "perfect" mirror;

Second, locating a very thin film of magnetic material having a thickness less than the optical penetration depth at an electric field node of the optical standing wave produced by the mirror;

Third, coupling the structure to free space by the use of a multilayer dielectric film impedance matching network.

Further, a properly oriented polarizer and crossed analyzer is found to be effective in increasing the signal-to-noise ratio of the dichroic magneto-optical effect.

In much of the foregoing discussion the magnetic film has been assumed to be metallic. However, the scope of this invention is not to be so limited. The use of non-metallic magnetic films, such as ferrites, has the advantage that with such materials there is no ohmic loss, and, therefore, a comparable modulation efficiency can be obtained with a thicker magnetic film. Furthermore, a non-metallic magnetic film need not necessarily be placed at an electric node, and in fact could be placed at an electric maximum. For some magnetic materials such placement would be advantageous due to the specific types of magneto-optical interaction which are possible in different materials. While manufacturing techniques for the production of extremely thin ferrite films are not as well advanced as that for metals, it is within the scope of present methods to produce useful films.

It is to be understood that the specific embodiments described are merely illustrative of the general principles of the invention. Various other arrangements can be devised by one skilled in the art without departing from the spirit and scope of the present invention as defined in the appended claims.

What is claimed is:

1. Apparatus for modulating the intensity of a beam of plane polarized light comprising, a composite reflector having a smooth surfaced substrate coated with a periodic dielectric film multilayer of quarter-wave layers of alternate low and high refractive indices to produce a nearly perfect mirror, a thin film of magnetic material magnetized in the plane of the film and oriented on the surface of said reflector with its magnetization perpendicular to the propagation vector and the optical magnetic field of said beam, whereby said magnetic film is placed at an optical electric field node of an optical standing wave produced by reflection of said beam, a dielectric film multilayer coating on the surface of said magnetic film adapted to match the magnetic absorption wave impedance of said film to free space, and means for applying an external magnetic field to shift the direction of magnetization in said magnetic film changing the optical absorption thereof and hence the amplitude of the reflected light wave.

2. Apparatus for modulating the intensity of a beam of plane polarized light having its optical magnetic field parallel to its plane of incidence comprising, a composite mirror possessing nearly perfect reflectivity composed of a substrate with a smooth surface coated with a periodic dielectric film multilayer having a succession of homogeneous quarter-wave layers of alternating low and high indices of refraction, a film of magnetic material thinner than the optical penetration depth placed on the reflective surface of said mirror, said film being magnetized in the plane of the film, means for producing a monochromatic beam of light incident at an angle to the film normal and perpendicular to the direction of magnetization of said film, means for matching the magnetic absorption wave impedance of said film to free space, a first polarizing element oriented at an angle of 45° to the plane of incidence and adapted to polarize said beam into a mode having the incident optical electric field vector at an angle of 45° to the plane of incidence, said electric field vector having a component parallel to said plane of incidence which is reflected by said film and a component perpendicular to said plane of incidence which is completely absorbed by said film, a second polarizing element oriented at a 90° angle to said first polarizing element and at a 45° angle to the plane of incidence, whereby a reflected wave having an optical electric field vector parallel to the plane of incidence possesses a component parallel to the transmission axis of said second polarizing element for transmission thereby, and means for applying an external magnetic field to shift the direction of magnetization in said magnetic film changing the optical absorption thereof and hence the amplitude of the reflected wave.

3. Apparatus as defined in claim 2 wherein said thin film of magnetic material is non-metallic located in said optical standing wave to obtain maximum magnetic absorption.

4. Apparatus as defined in claim 2 wherein said thin film is a metal thinner than the optical penetration depth located at an electric node of said optical standing wave to minimize ohmic loss.

5. Apparatus for enhancing the magneto-optical dichroic absorption effect produced on a beam of plane polarized light by reflection from magnetized material comprising, a light source for producing a beam of light at a predetermined wavelength, a mirror for establishing an optical standing wave by reflecting said beam from a smooth surface, means for polarizing said beam into a mode having its optical magnetic field parallel to the plane of incidence, a periodic dielectric film multilayer coating on the reflecting surface of said mirror adapted to enhance its reflectivity, said coating having a plurality of homogeneous quarter-wave double layers of alternate low and high refractive indices, a film of magnetic material thinner than the optical penetration depth of said beam positioned with its magnetization oriented perpendicular to the propagation vector of said beam at an electric field node of said optical standing wave to eliminate energy absorption in said magnetic film by ohmic loss, and a dielectric film multilayer impedance matching network placed on the surface of said magnetic film to match the magnetic absorption wave impedance to free space.

References Cited

UNITED STATES PATENTS

| | | | |
|---|---|---|---|
| 3,142,720 | 7/1964 | Adams | 350—151 |
| 3,158,673 | 11/1964 | Sites | 350—151 |
| 3,162,785 | 12/1964 | Scoledge et al. | 350—166 |
| 3,224,333 | 12/1965 | Kolk et al. | 350—151 |

OTHER REFERENCES

Young, "Synthesis of Multiple Antireflection Films over a Prescribed Frequency Band," J.O.S.A. vol. 51, No. 9, (September, 1961) pp. 967–974.

DAVID SCHONBERG, *Primary Examiner.*

P. R. MILLER, *Assistant Examiner.*

U.S. Cl. X.R.

350—150, 152, 154, 160, 166